J. M. WEAVER.
Harvester Finger-Guard.

No. 212,637. Patented Feb. 25, 1879.

UNITED STATES PATENT OFFICE.

JAMES M. WEAVER, OF SCENERY HILL, PENNSYLVANIA.

IMPROVEMENT IN HARVESTER FINGER-GUARDS.

Specification forming part of Letters Patent No. 212,637, dated February 25, 1879; application filed January 9, 1879.

*To all whom it may concern:*

Be it known that I, JAMES M. WEAVER, of Scenery Hill, in the county of Washington and State of Pennsylvania, have invented certain new and useful Improvements in Finger-Guards for Harvesters, of which the following is a full, clear, and exact description, such as will enable others skilled in the art to which it pertains to make and use it, reference being had to the accompanying drawings, which form a part of this specification.

My invention relates to an improvement in finger-guards for harvesters.

It is well known that in the operation of the harvester the lower portion or shank of the finger-guard becomes worn by reason of its frictional contact with the knives, and the guard is consequently soon materially impaired, its effective operation prevented, and it must soon be replaced by a new one.

The object of my invention is to so construct the guard that its cutting-surface may be sharpened and re-edged, and thus obviate the serious defect in these guards, as above mentioned.

Figure 1:
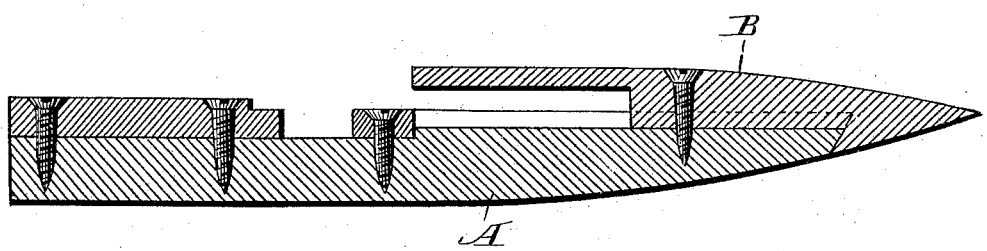
Figure 2:
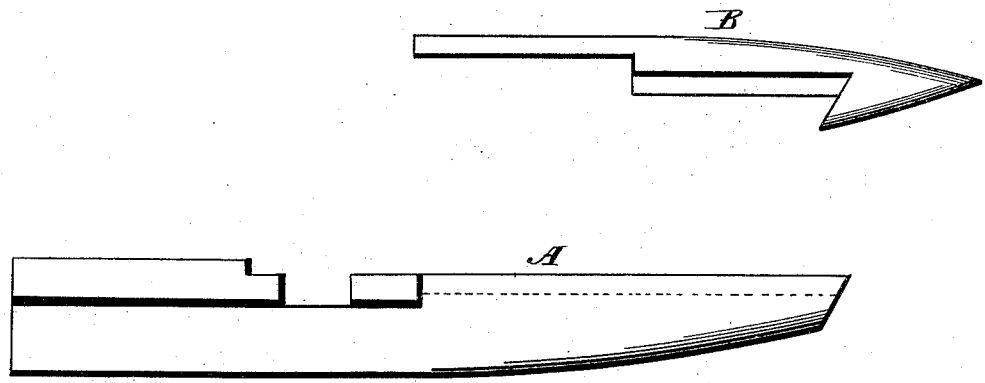

Referring to the drawings, Figure 1 represents a longitudinal vertical section of a finger-guard for harvesters constructed in accordance with my invention. Fig. 2 shows a side elevation of the guard with the parts separated.

A represents the shank, and B the combined point and top portion, of the guard. The parts A and B are connected together by a tongue-and-groove connection and one or more screws or bolts.

It will be observed that by this construction the point and upper portion of the guard are formed in one piece, and are securely connected with the shank A; and the guard is thus formed as compactly and reliably as if the same were made of a single piece of material.

Another obvious advantage arising from my novel construction of finger-guard is, that while the cutting portion of the same is preferably made of steel, the point and portion B may be of cast-iron, and the cost of manufacture is thus materially lessened.

Having fully described my invention, what I claim, and desire to secure by Letters Patent, is—

A harvester finger-guard formed of two parts, fastened together by tongue-and-groove engagement and one or more screws, the lower portion having its forward end cut off at an acute angle and abutting against a shoulder on the upper portion, substantially as described.

In testimony that I claim the foregoing I have hereunto set my hand this 23d day of December, A. D. 1878.

JAMES M. WEAVER.

Witnesses:
JAMES A. WORK,
JAMES B. KENNEDY.